(12) United States Patent
Jaranson et al.

(10) Patent No.: US 9,604,553 B2
(45) Date of Patent: Mar. 28, 2017

(54) VIRTUAL H-POINT SEAT BACK SYSTEM

(71) Applicant: Ford Global Technologies, LLC, Dearborn, MI (US)

(72) Inventors: John W. Jaranson, Dearborn, MI (US); Grant A. Compton, Livonia, MI (US); Johnathan Andrew Line, Northville, MI (US); Kendrick Alden Harper, Temperance, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 211 days.

(21) Appl. No.: 13/711,278

(22) Filed: Dec. 11, 2012

(65) Prior Publication Data

US 2014/0159457 A1   Jun. 12, 2014

(51) Int. Cl.
*B60N 2/20* (2006.01)
*B60N 2/22* (2006.01)
*B60N 2/02* (2006.01)

(52) U.S. Cl.
CPC .............. *B60N 2/22* (2013.01); *B60N 2/0232* (2013.01); *B60N 2/20* (2013.01); *B60N 2/2213* (2013.01); *B60N 2/2222* (2013.01); *B60N 2/2227* (2013.01)

(58) Field of Classification Search
CPC ........................................................ B60N 2/20
USPC ...................................... 297/358, 361.1, 341
See application file for complete search history.

(56) References Cited

U.S. PATENT DOCUMENTS

| 4,386,805 | A | * | 6/1983 | Boisset | 297/362 |
|---|---|---|---|---|---|
| 4,770,463 | A | * | 9/1988 | Nishino | B60N 2/2352 248/430 |
| 4,973,104 | A | * | 11/1990 | Nakayama et al. | 297/341 |
| 5,203,608 | A | | 4/1993 | Tame | |
| 5,338,093 | A | * | 8/1994 | Ikegaya et al. | 297/367 R |
| 5,360,256 | A | * | 11/1994 | Miller et al. | 297/361.1 |
| 5,433,507 | A | * | 7/1995 | Chang | 297/367 R |
| 5,863,098 | A | * | 1/1999 | Kojima | B60N 2/1615 248/421 |
| 5,882,074 | A | * | 3/1999 | Kojima | B60N 2/123 248/429 |
| 6,135,559 | A | * | 10/2000 | Kowalski | 297/354.12 |
| 6,502,798 | B1 | * | 1/2003 | Frohnhaus | B60N 2/1615 248/421 |
| 6,729,594 | B2 | * | 5/2004 | Ikegaya | B60N 2/1615 248/396 |
| 6,827,404 | B2 | * | 12/2004 | Blair | B60N 2/06 297/344.11 |

(Continued)

FOREIGN PATENT DOCUMENTS

EP    0594526 B1    9/1997
JP    2011098588 A    5/2011

*Primary Examiner* — Syed A Islam
(74) *Attorney, Agent, or Firm* — Vichit Chea; Price Heneveld LLP (57) ABSTRACT

A seat recliner system includes a seat back having a back support member configured to support the back of a passenger. A connecting member extends generally orthogonally from a lower end of the back support member. The connecting member includes a front portion and a rear portion. A seat base includes a forward link operably coupled to the front portion of the connecting member. A rearward link is operably coupled to the rear portion of the connecting member such that the seat back is rotatable about a virtual hip-point of a passenger that is above the seat base and forward of the seat back.

14 Claims, 8 Drawing Sheets

(56) References Cited

U.S. PATENT DOCUMENTS

| | | | | |
|---|---|---|---|---|
| 8,038,198 | B2* | 10/2011 | Yamagishi | B60N 2/12 296/90 |
| 8,070,230 | B2* | 12/2011 | Krob et al. | 297/300.5 |
| 8,096,616 | B2* | 1/2012 | Ventura | B60N 2/206 296/65.09 |
| 2005/0179290 | A1* | 8/2005 | Hancock et al. | 297/284.4 |
| 2008/0048477 | A1* | 2/2008 | Ujimoto et al. | 297/344.1 |
| 2010/0259081 | A1 | 10/2010 | Kuno | |
| 2012/0217779 | A1* | 8/2012 | Gaither | B60N 2/242 297/316 |
| 2014/0167466 | A1* | 6/2014 | Line | B60N 2/3065 297/340 |

* cited by examiner

VIRTUAL H-POINT SEAT BACK SYSTEM

FIELD OF THE INVENTION

The present invention generally relates to a vehicle seat recliner system, and more particularly to a vehicle seat recliner system that rotates about a virtual hip-point (H-point) of a seated passenger.

BACKGROUND OF THE INVENTION

Passenger vehicles commonly include seating assemblies having recliner systems. These recliner systems typically include a seat base pivotally coupled with a seat back, such that the seat back pivots relative to the seat base about the pivotal connection between the seat back and the seat base.

SUMMARY OF THE INVENTION

According to one aspect of the present invention, a seat recliner system includes a seat back having a back support member configured to support the back of a passenger. A connecting member extends generally orthogonally from a lower end of the back support member. The connecting member includes a front portion and a rear portion. A seat base includes a forward link operably coupled to the front portion of the connecting member. A rearward link is operably coupled to the rear portion of the connecting member such that the seat back is rotatable about a virtual hip-point of a passenger that is above the seat base and forward of the seat back.

According to another aspect of the present invention, a vehicle seat recliner system includes a seat back having a back support member and a connecting member. A seat base includes a forward link and a rearward link. The forward link is operably coupled to a front portion of the connecting member. The rearward link is operably coupled to a rear portion of the connecting member such that the seat back is rotatable about a hip-point of a passenger.

According to yet another aspect of the present invention, a vehicle seat recliner system includes a seat back having a back support member. A connecting member extends generally orthogonally from the back support member. The vehicle seat recliner system includes a seat base. A linkage assembly operably couples the connecting member with the seat back such that the seat back is rotatable about a virtual hip-point disposed above the seat base and forward of the seat back.

These and other aspects, objects, and features of the present invention will be understood and appreciated by those skilled in the art upon studying the following specification, claims, and appended drawings.

DETAILED DESCRIPTION OF THE EMBODIMENTS

Figures 1, 2:
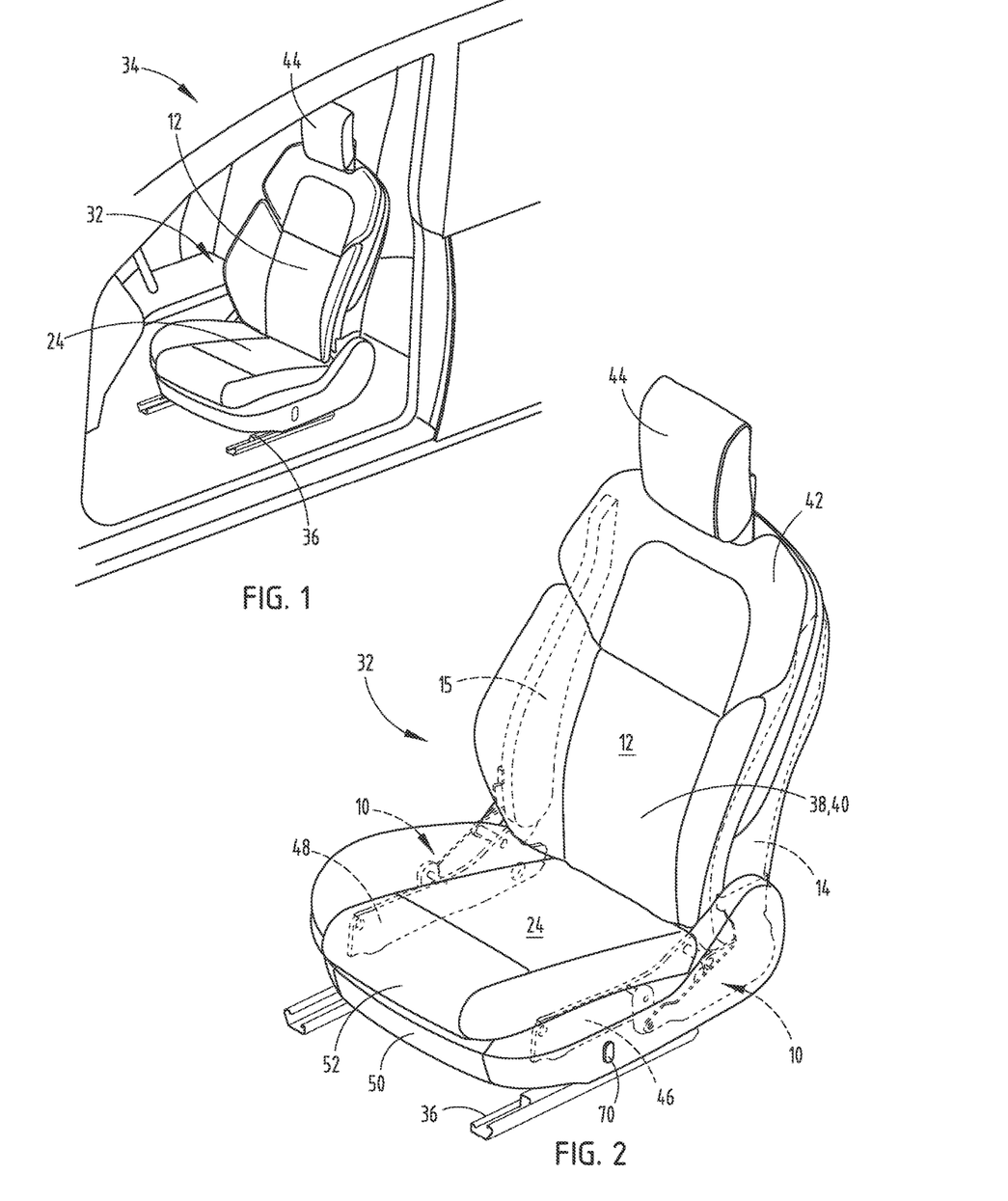
FIG. 1 is a top perspective view of a vehicle seat assembly in a vehicle.
FIG. 2 is a top perspective view of the vehicle seat assembly having a seat recliner system shown in dashed lines.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring to FIGS. 1-12A, reference numeral 10 generally designates a seat recliner system with a seat back 12 having a back support member 14 configured to support the back of a passenger. A connecting member 16 extends generally orthogonally from a lower end 18 of the back support member 14. The connecting member 16 includes a front portion 20 and a rear portion 22. A seat base 24 includes a forward link 26 operably coupled to the front portion 20 of the connecting member 16. A rearward link 28 is operably coupled to the rear portion 22 of the connecting member 16 such that the seat back 12 is rotatable about a virtual hip-point 30 of a passenger that is above the seat base 24 and forward of the seat back 12.

Referring now to FIG. 1, a vehicle seat assembly 32 is shown in a vehicle 34. The vehicle seat assembly 32 includes the seat base 24 pivotally coupled with the seat back 12. The seat base 24 is slidably coupled with a floor of the vehicle 34 about a track assembly 36. The track assembly 36 is configured to allow the vehicle seat assembly 32 to be adjusted in the forward and rearward directions relative to the vehicle 34, as is commonly known in the art. It is understood that the vehicle seat assembly 32 may be positioned at various locations throughout the vehicle 34 other than the illustrated location, such as the passenger side location, a center row location, and a rear seat location. It is also conceivable that the seat assembly 32 may not include the track assembly 36 and alternatively may be fixedly coupled with the floor of the vehicle 34.

As shown in FIG. 2, the vehicle seat assembly 32 contains one embodiment of the seat recliner system 10, illustrated in dash lines. The seat back 12 of the vehicle seat assembly 32 includes the first back support member 14 and a second back support member 15 that each extend on opposing sides of the seat back 12. A passenger support 38 extends between the first and second back support members 14, 15, defining a support surface 40 that together with the back support members 14, 15 is configured to support the back of a passenger. In addition, an upper portion of the back support members 14, 15 engage and support a head restraint 44 extending upward in general alignment with the seat back 12.

Figures 3, 4, 5:
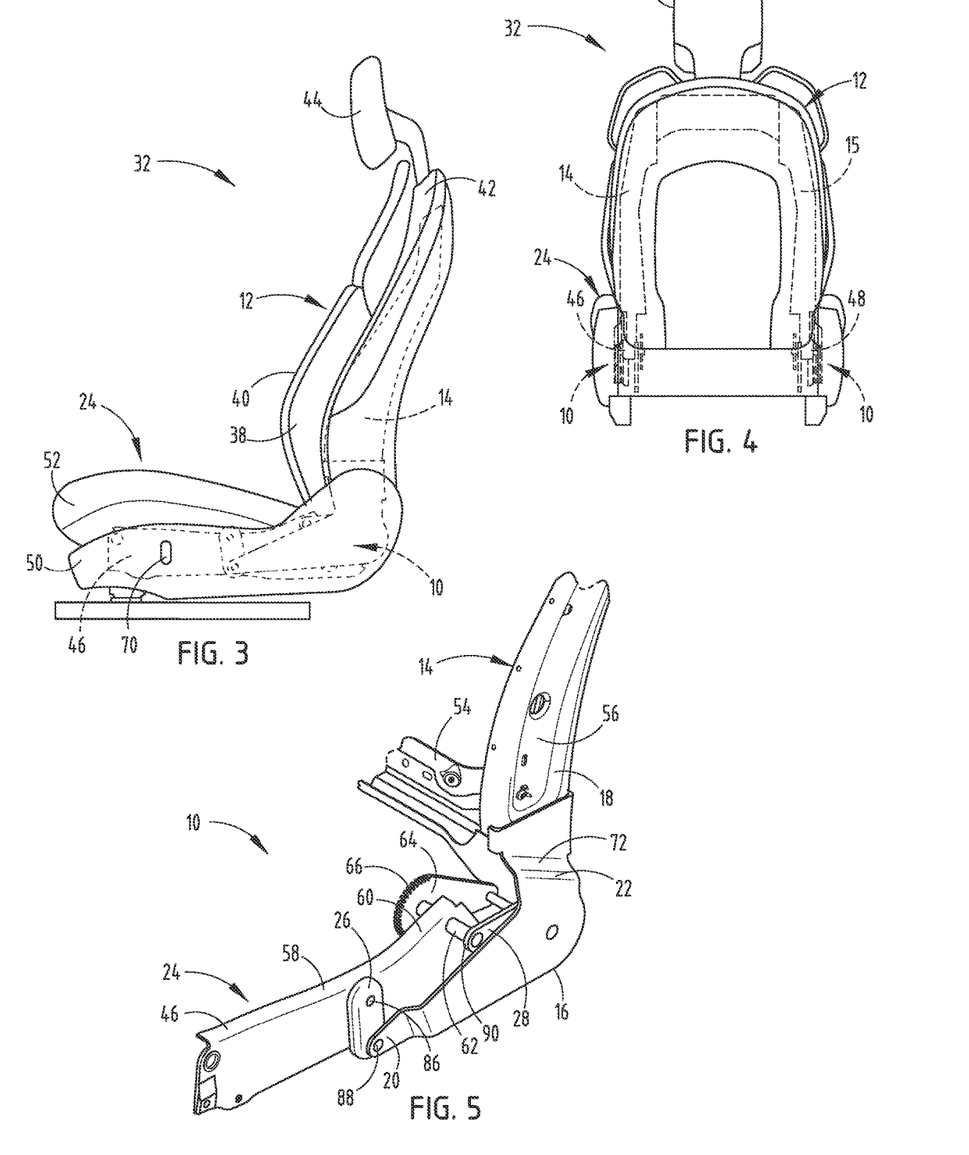
FIG. 3 is a side elevational view of the vehicle seat assembly with the seat recliner system shown in dashed lines.
FIG. 4 is a rear elevational view of the vehicle seat assembly with the seat recliner system shown in dashed lines.
FIG. 5 is a partial top perspective view of the seat recliner system with a cutaway portion of a frame portion of a seat back.

The illustrated embodiment, as shown in FIG. 3, includes the first and second back support members 14, 15 having a contour formed to the general shape of an occupant's spine. In addition, the passenger support 38 is similarly contoured and extends forward from the back support members 14, 15 to the support surface 40. In the illustrated embodiment, the passenger support 38 includes a cover stock disposed over a cushion to form the support surface 40. It is understood to one having ordinary skill in the art that the passenger support 38 may alternatively include a foam cushion or other type of padding that can be disposed over and extend forward from the back support members 14, 15 to define a single or divided back support component. It is also conceivable that a single back support member may be used, such as a continuous member spanning behind the passenger support 38, or more than two back support members may be incorporated into a seat assembly. In addition, it is conceivable that the head restraint 44 may be an integral component of the seat back 12.

Still referring to FIGS. 2-3, the seat base 24 includes a first base member 46 and a second base member 48 extending on opposing sides of the seat base 24 in substantial alignment with the track assembly 36. A seat pan 50 extends between the first and second base members 46, 48 to support an occupant in the vehicle seat assembly 32. A flexible cushion 52 is at least partially supported by the seat pan 50, and the seat base 24 also includes a cover stock material disposed over the flexible cushion 52. The first and second base members 46, 48 may conceivably be an integral piece with the seat pan 50. Similar to the seat back 12, it is understood to one having ordinary skill in the art that the flexible cushion 52 may include a foam cushion or other flexible padding material. In addition, the cover stock material over the seat base 24 and the seat back 12 may include leather, polyester, cotton, and mesh, among other types of upholstery known in the art.

As illustrated in FIG. 4, the first and second back support members 14, 15 extend upward in substantially parallel alignment and interconnect at the upper portions thereof to support the head restraint 44. The first and second base members 46, 48 also extend forward in substantially parallel alignment. Accordingly, the first back support member 14 and first base member 46 are substantially mirror images of the respective second back support member 15 and the second base member 48. As such, it is understood that various other components of the seat recliner system 10 include a mirror image component on an opposing side of a vehicle seat 32. Therefore, the following will describe the seat recliner system 10 as a single side of the vehicle seat 32. However, it is also conceivable that a component may not have a mirror image component, and instead be omitted from the opposing side or have a duplicative component incorporated into the seat recliner system 10.

Referring now to FIG. 5, the back support member 14 is shown as a frame portion of the seat back 12. A lower end 18 of the back support member 14 couples with a cross bar 54 that extends between an inside face of the first and second back support members 14, 15. The connecting member 16 couples with an outside face 56 of the lower end 18 of the back support member 14 and extends forward generally orthogonally from the back support member 14. The connecting member 16 of the seat back 12 couples with the base member 46 of the seat base 24 to support the back support member 14 and other components of the seat back 12. The connecting member 16 is fixedly coupled with the lower end 18 of the back support member 14, such as being welded or otherwise fused to the back support member 14. However, it is conceivable that the connecting member 16 may be attached in alternative arrangements, such as with fasteners. It is also conceivable that the connecting member 16 and back support member 14 are integrally formed as a single piece and that the back support member 14 may be formed in an alternative arrangement from that shown in FIG. 5.

In the embodiment illustrated in FIG. 5, an intermediate portion 58 of the seat base 24 has the forward link 26 pivotally coupled with the front portion 20 of the connecting member 16. In addition, a rearward portion 60 of the seat base 24 has the rearward link 28 pivotally coupled with the rear portion 22 of the connecting member 16. Accordingly, the forward link 26 and the rearward link 28 operably couple to the connecting member 16, thereby attaching the connecting member 16 to the seat base 24 to allow the seat back 12 to rotatably move relative to the seat base 24. It is conceived that the forward and rearward links 26, 28 may be alternatively coupled and alternatively positioned between the base member 46 and the connecting member 16 to allow the seat back 12 to rotate relative to the seat base 24 about the virtual hip-point 30.

Figure 6:
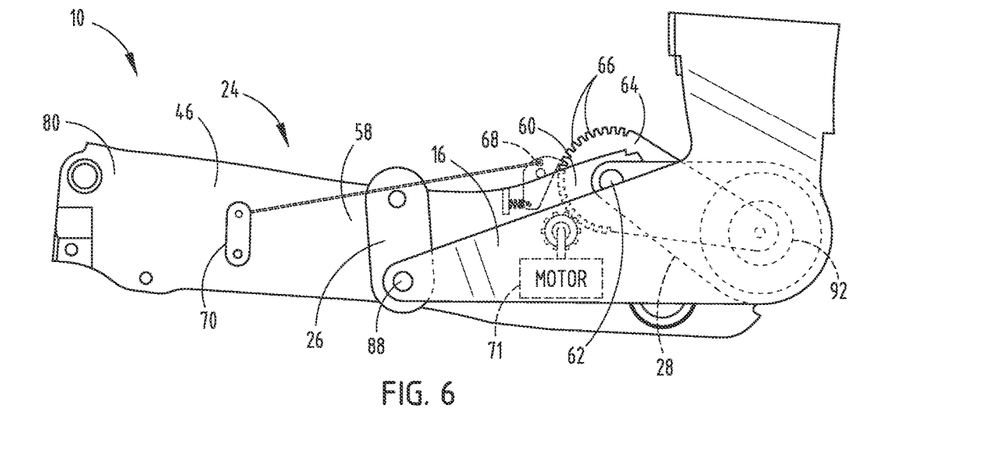
FIG. 6 is a side elevational view of the seat recliner system.

As shown in FIGS. 5-6, the rearward link 28 includes a pivot rod 62 that extends through the rearward portion 60 of the seat base 24 to couple with a position securing member 64. The position securing member 64 includes a plurality of securing teeth 66 that are equally spaced and radially positioned at a substantially equal distance from the pivot rod 62. An engagement member 68 with a pawl latch is configured to align and engage with the plurality of securing teeth 66. The pawl latch engages the plurality of securing teeth 66 such that the engagement member 68 may be used to lock rotational movement of the pivot rod 62, thereby restricting pivotal movement of the connecting member 16 and the seat back 12 relative to the seat base 24. A recliner handle 70 is included to operate the engagement member 68, allowing actuation of the reclining handle 70 to release and engage the pawl latch with the plurality of the securing teeth 66. It is conceivable that a recliner heart may additionally or alternatively engage the position securing member 64 to releasably lock the rotational movement of the pivot rod 62. Further, it is conceivable that a motor 71, as shown in FIG. 6, may also be included to couple with the position securing member 64 to restrict pivotal movement of the seat back 12 relative to the seat base 24 and actuate rotational movement of the position securing member 64 to adjust the relative position of the seat back 12 with the seat base 24. It is conceivable that various alternative arrangements may be incorporated to provide lockable reclining functions and actuatable reclining functions, as may be known in the art.

Figure 7:
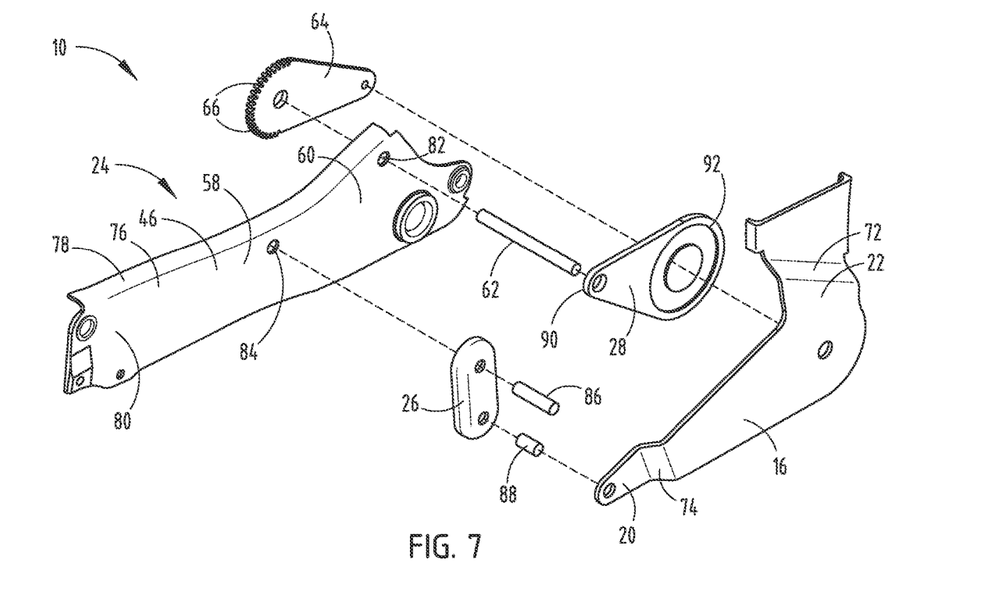
FIG. 7 is an exploded top perspective view of the seat recliner system.

As illustrated in FIG. 7, the connecting member 16 is substantially "L" shaped with a generally uniform thickness and a width that tapers from the rear portion 22 of the connecting member 16 to the front portion 20 of the connecting member 16. With such a shape, the rear portion 22 of the connecting member 16 extends orthogonally upward to a width substantially equal to the width of the back support member 14 (FIG. 5) and includes a slight inward bend 72 proximate the rear portion 22. Further, the front portion 20 of the connecting member 16 includes a slight bend 74 that projects the front portion 20 laterally inward toward the base member 46 that together with the inward bend 72 proximate the rear portion 22 provides space between the base member 46 and the connecting member 16 for the rearward link 28 and movement of the rearward link 28 upon rotational movement of the seat back 12 relative to the seat base 24. The connecting member 16 may conceivably include alternative shapes and configurations to accommodate the forward link 26 and the rearward link 28.

As further illustrated in FIG. 7, the base member 46 is substantially rectangular shaped with a side support 76 and an orthogonally extending top flange 78. The base member 46 includes a front portion 80, an intermediate portion 58, and a rearward portion 60. The rearward portion 60 has an aperture 82 for pivotally containing the pivot rod 62. However, other embodiments may include an alternative feature to pivotally couple the rearward link 28, such as a swivel connection. Similarly, the intermediate portion 58 of the base member 46 also includes an aperture 84 to pivotally couple with a top peg 86 of the forward link 26. A bottom peg 88 of the forward link 26 extends away from the base member 46 toward the connecting member 16 to pivotally couple with the front portion 20 of the connecting member 16. Further, the forward link 26 and rearward link 28 are pivotally coupled to an upper portion of the seat base 24, which more specifically includes a top area of the base member 46, on the side support 76 proximate the top flange 78. However, it is understood that the forward and rearward links 26, 28 may be coupled with other portions of the base member 46 in additional embodiments.

The forward link 26, as shown in FIG. 7, is substantially oval shaped and elongated between the top peg 86 and the bottom peg 88. The rearward link 28 is substantially teardrop shaped with the pivot rod 62 extending inward toward the base member 46 from a narrow end 90 of the rearward link 28. A large end 92 of the rearward link 28 pivotally couples with the rear portion 22 of the connecting member 16. It is conceivable that the position securing member 64 or an additional position securing member may be coupled with the forward link 28 to lock the rotational movement of the connecting member relative to the base member 46. It is also understood that the shapes and configurations of the forward and rearward links 26, 28 may assume alternative dimensions and arrangements in additional embodiments to provide the rotational movement of the seat back 12 about the virtual hip-point 30.

Figure 8:
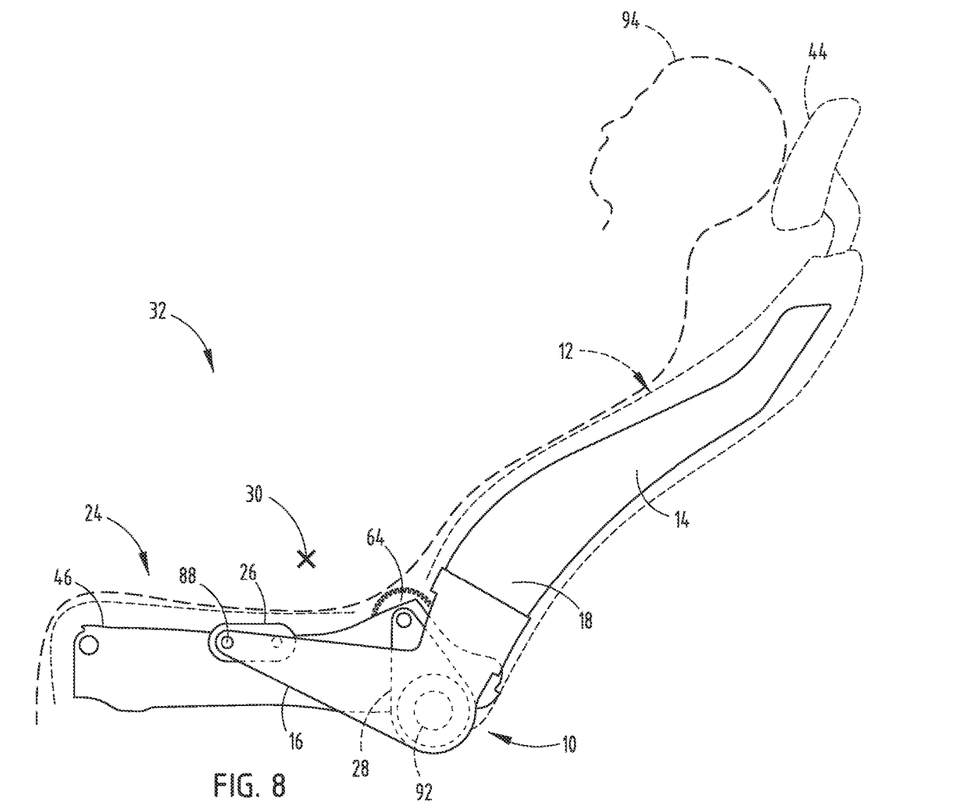
FIG. 8 is a side elevational view of the seat recliner system of a vehicle seat assembly in a reclined position with an occupant shown in dashed lines sitting in the seat assembly.

In use of the seat recliner system 10, the seat back 12 pivots relative to the seat base 24 about the virtual hip-point 30 of a passenger 94 seated in the seating assembly 32, as shown in FIG. 8. The seated passenger 94 typically has legs and a pelvis supported by the flexible cushion 52 on the seat pan 50 of the seat base 24. In accordance with variation in potential leg and pelvis size and position of the seated passenger 94, the virtual hip-point 30 is generally estimated for a majority of passengers. More specifically, the virtual hip-point 30 is positioned where the passenger's pelvis will likely connect with the passenger's legs. In addition, the seated passenger's spine is supported by the passenger support 38 of the seat back 12, which is also shaped to correspond to a majority of passengers. Accordingly, the seated passenger 94 is positioned above the seat base 24 and forward of the seat back 12.

Figure 8A:
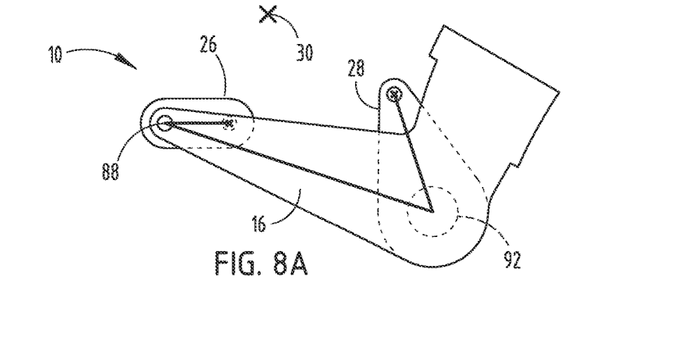
FIG. 8A is a side elevational schematic view of the seat recliner system in a reclined position.

As shown in FIGS. 8-8A, the seat assembly 32 is in the reclined position, which adjusts the relative position of the linkage assembly, including the forward and rearward links 26, 28, from a normal position, as shown in FIG. 3. The forward link 26 is rotated to be in substantially parallel alignment with the base member 46, such that the bottom peg 88 is rotated upward and forward from the normal position. Also, the rearward link 28 is rotated to substantially orthogonal alignment with the forward link 26, such that the large end 92 of the rearward link 28 is rotated downward and forward from the normal position. Such an alignment of the forward and rearward links 26, 28 in the reclined position causes the connecting member 16 to angle rearward, and thereby causes the seat back 12 to similarly recline in conjunction with the connecting member 16. The illustrated embodiment of the reclined position is shown for explanation purposes and is not to limit the maximum angle at which the seat back 12 may recline relative to the seat base 24. Also, it is conceivable that the relative positions of the forward and rearward links 26, 28 may include alternative positions with embodiments having altered dimensions and positions of the illustrated features of the seat recliner system 10.

Figure 9:
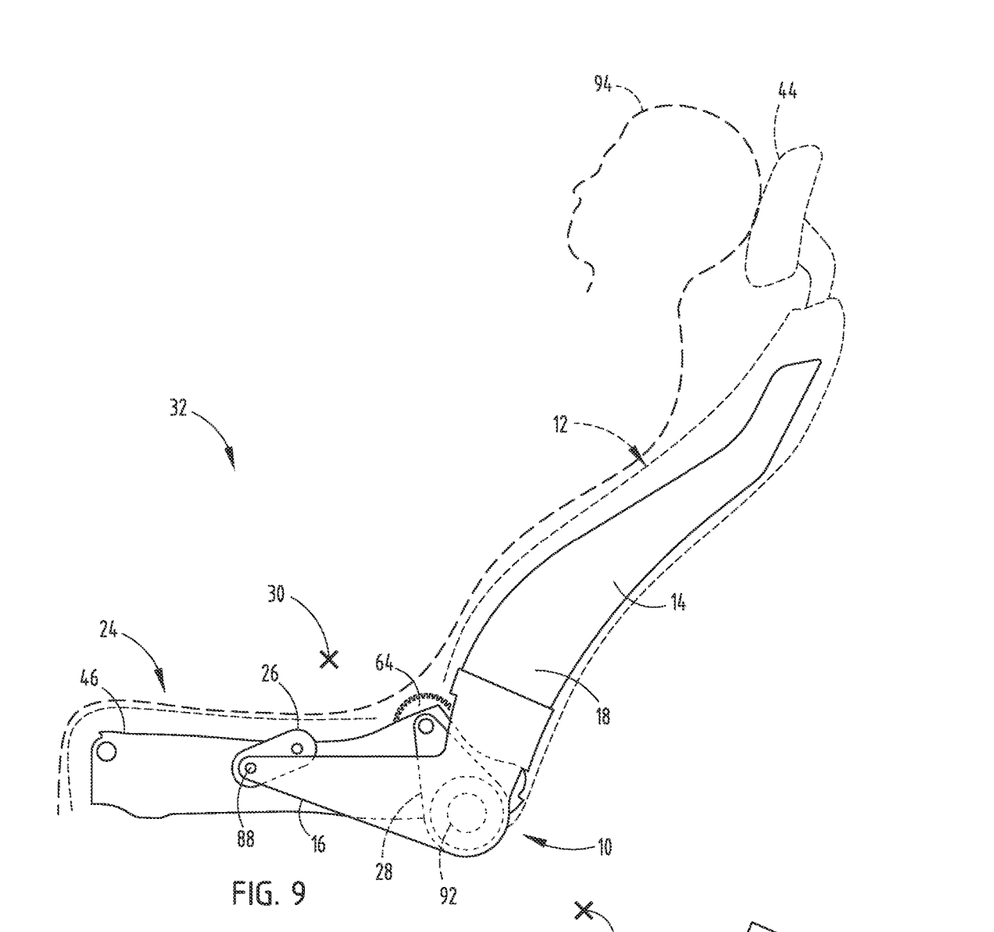
FIG. 9 is a side elevational view of the seat recliner system of a vehicle seat assembly between the reclined position and a normal position with an occupant shown in dashed lines sitting in the seat assembly.
Figure 9A:
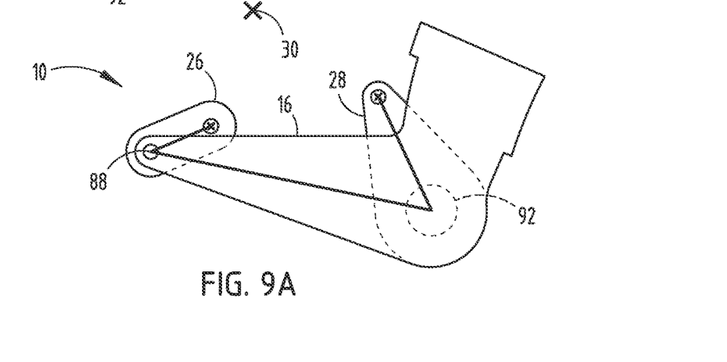
FIG. 9A is a side elevational schematic view of the seat recliner system between the reclined position and the normal position.

The seat assembly 32, as shown in FIGS. 9-9A, is between the reclined position and the normal position. Accordingly, in movement toward the normal position, the seat back 12 is moved to have a steeper incline and to generally pivot forward about the virtual hip-point 30 of the passenger. This forward movement toward the normal position causes the connecting member 16 to have less of a rearward angle, rotating the position of the bottom peg 88 of the forward link 26 down and rearward and the large end 92 of the rearward link 28 further rearward. It is understood that the seat back 12 may be locked at essentially any incremental position including and between the reclined position and the normal position by the locking features, including the position securing member 64.

Figure 10:
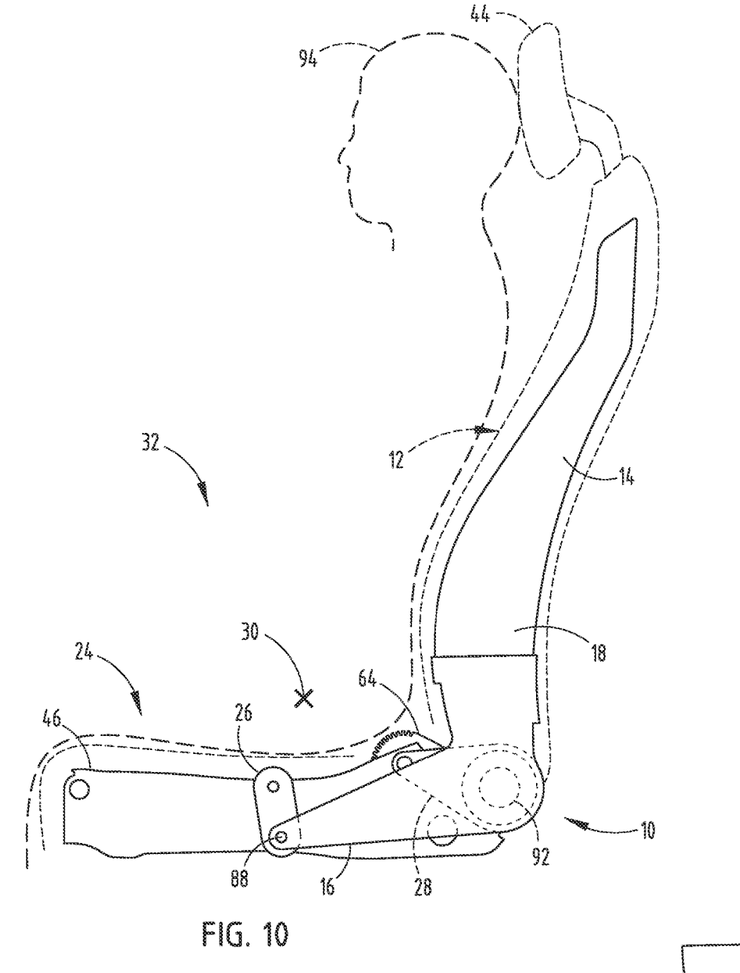
FIG. 10 is a side elevational view of the seat recliner system of a vehicle seat assembly in a normal position with an occupant shown in dashed lines sitting in the seat assembly.
Figure 10A:
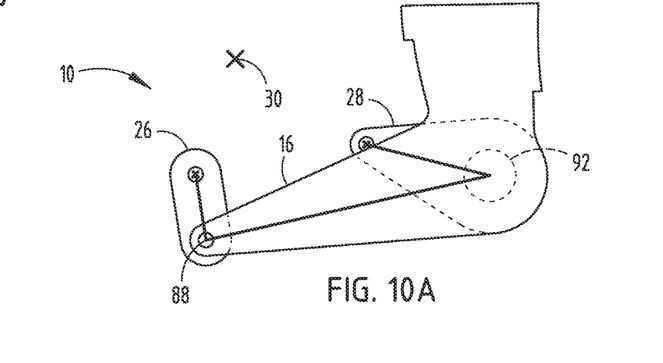
FIG. 10A is a side elevational schematic view of the seat recliner system in a normal position.

As illustrated in FIGS. 10-10A, the seat assembly 32 is in the normal position, also referred to as the upright position, which is typically a seating position for the passenger 94 operating the vehicle 34. As such, the relative position of the linkage assembly includes the forward link 26 substantially orthogonal relative to the base member 46 and the rearward link 28 in substantial alignment with the base member 46. The bottom edge of the connecting member 16 is also in substantially parallel alignment with the base member 46 when the seat assembly 32 is in the normal position. The normal position, as illustrated, may include alternative positions and does not limit the angle of the seat back 12 relative to the seat base 24 in the normal position. It is understood that the seat back 12 may also transition from the normal position back to the reclined position (FIGS. 8-8A) or any incremental position there between.

Upon translation between the normal position and the reclined position, the seat back 12 pivots about the virtual hip-point 30 of the passenger 94. Rotational movement of the seat back 12 about the virtual hip-point 30 substantially reduces the longitudinal movement between the passenger support 38 of the seat back 12 and the passenger's back, which thereby reduces friction between the passenger's back and the support surface 40 that can commonly move the passenger's clothing up or down relative to the passenger's back. Accordingly, rotational movement of the seat back 12 about the virtual hip-point 30 will generally maintain consistent support of the passenger's lower back, substantially reducing the frequency of adjusting the passenger's seated position forward and rearward on the seat base 24.

Figure 11:
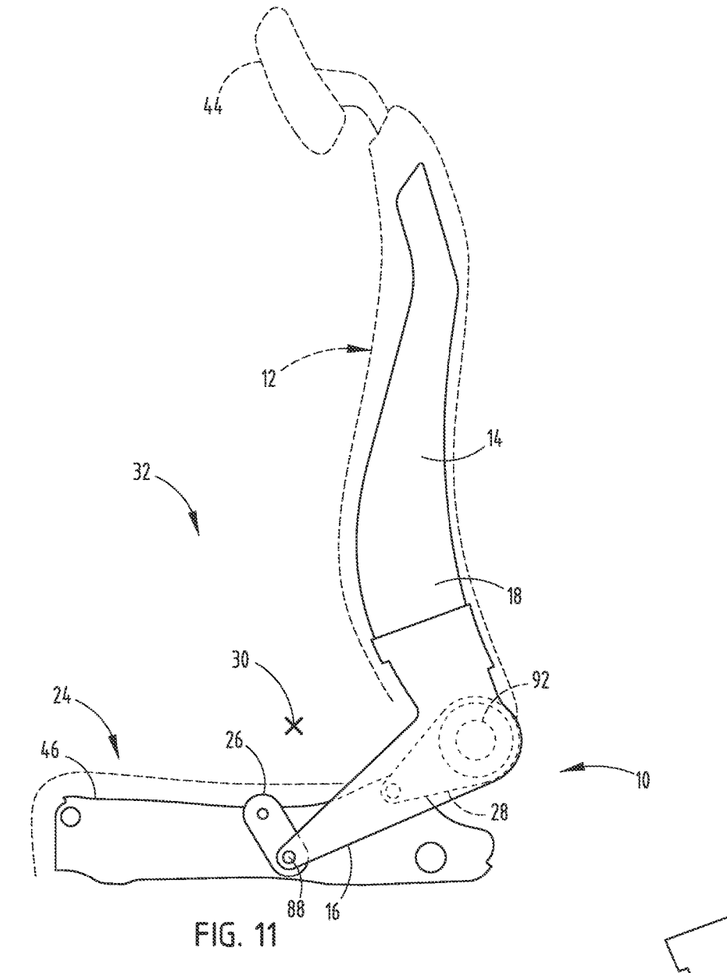
FIG. 11 is a side elevational view of the seat recliner system of a vehicle seat assembly between the normal position and a rear access position.
Figure 11A:
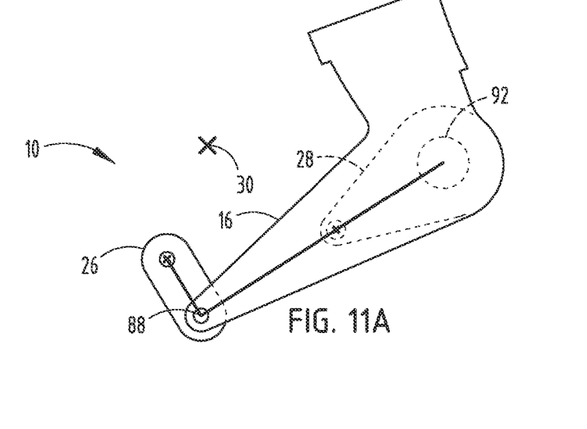
FIG. 11A is a side elevational schematic view of the seat recliner system between the normal position and the rear access position.
Figures 12, 12A:
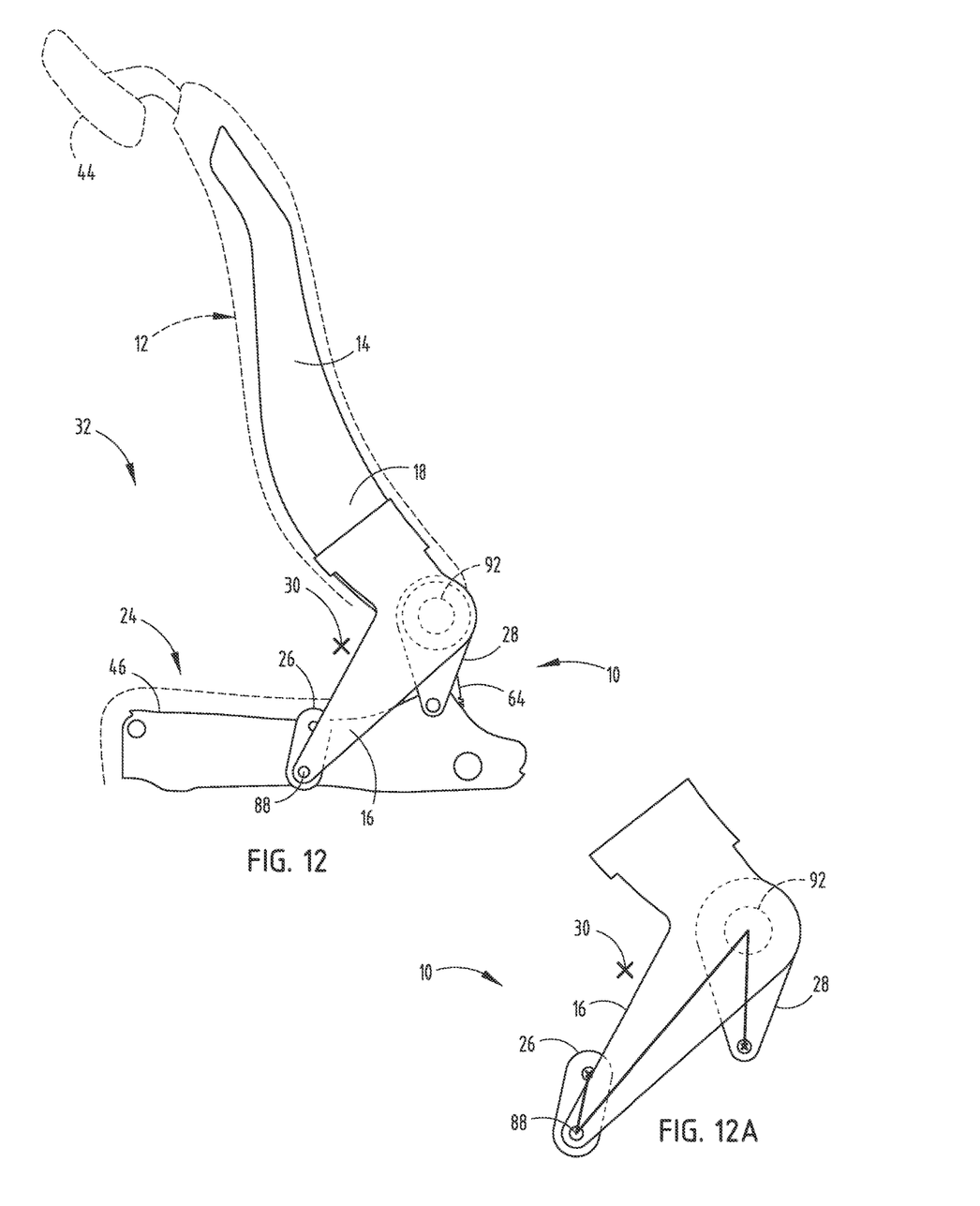
FIG. 12 is a side elevational view of the seat recliner system of a vehicle seat assembly in the rear access position.
FIG. 12A is a side elevational schematic view of the seat recliner system in the rear access position.

From the normal position, the seat assembly 32 may also be moved to a forward access position as shown in FIGS. 12-12A, to enlarge the area rearward the seat assembly 32 for ingress and egress or additional storage rearward the seat assembly 32. In such a forward access position and transition thereto, the passenger 94 is generally not seated in the seating assembly 32. As illustrated in FIGS. 11-11A, the seat assembly 32 is between the normal position and the rear access position. Accordingly, in movement toward the forward access position, the seat back 12 is pivoted forward to raise the seat back 12. This forward movement causes the connecting member 16 to angle rearward, rotating the position of the bottom peg 88 of the forward link 26 upward and rearward. The large end 92 of the rearward link 28 is swung upward above the base member 46, raising the seat back 12 upward and tipping the seat back 12 forward.

As shown in FIGS. 12-12A, the seat assembly 32 is in the rear access position, adjusting the relative positions of the linkage assembly of the seat recliner system 10. In the rear access position, the seat back 12 is angled forward and positioned entirely above the seat base 24, such that the rearward link 28 is substantially orthogonal to the base member 46 with the large end 92 of the rearward link 28 entirely above the base member 46. The forward link 26 assumes a substantially similar position to its position when the seat assembly 32 is in the normal position, with the bottom peg 88 below the top peg 86. As such, the forward link 26 is in substantially parallel alignment with the rearward link 28. The connecting member 16 in the rear access position is lifted and tipped forward to generally expand the area rearward the seat assembly 32 more than traditional reclining vehicle seats that do not raise forward the lower end 18 of the back support member 14. Accordingly, the area rearward the seat assembly 32 is expanded in the rear access position without adjusting the seat base 24.

In the illustrated embodiment of FIGS. 12-12A, the rear access position is shown for explanation purposes and is not to limit the maximum angle at which the seat back 12 may be rotated forward relative to the seat base 24. It is also conceivable that the seat back 12 may be locked at essentially any incremental position including and between the normal position and the rear access position by the locking features, including the position securing member 64.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. A seat recliner system comprising:
   a seat back including:
      a back support member configured to support the back of a passenger;
      a connecting member extending forward generally orthogonally from a lower end of the back support member, the connecting member including a front portion and a rear portion; and
   a seat base including:
      a base member supporting a seat cushion;

a forward link operably coupled between the front portion of the connecting member and an intermediate portion of the base member, wherein the forward link is rotatable about a top peg that is coupled to the seat base between a first position wherein a bottom peg of the forward link is disposed substantially below the top peg and a second position wherein the bottom peg extends in a vehicle forward direction of the top peg; and a rearward link operably coupled between the rear portion of the connecting member and a rearward portion of the base member, such that the forward and rearward links recline the seat back about a virtual hip-point of a passenger that is above the seat base and forward of the seat back.

2. The seat recliner system of claim 1, further comprising:
a motor operably coupled to the forward link and the rearward link and including an actuator for adjusting the seat back between normal and reclined positions.

3. The seat recliner system of claim 1, wherein the seat cushion is disposed over a seat pan supported by the base member of the seat base.

4. The seat recliner system of claim 1, further comprising:
a position-securing member including a plurality of securing teeth.

5. The seat recliner system of claim 4, further comprising:
an engagement member including a plurality of engagement teeth engaged with and complementary to the plurality of securing teeth.

6. The seat recliner system of claim 1, wherein a bottom portion of the seat back translates down and forward relative to the seat base as the seat back reclines.

7. A vehicle seat recliner system comprising:
a seat back including a back support member and a connecting member extending therefrom; and
a seat base including:
a base member;
a forward link rotatable about a top peg coupled to the base member and coupled to a front portion of the connecting member; and
a rearward link rotatable about a pivot rod coupled to the base member and coupled to a rear portion of the connecting member, the top peg and the pivot rod extending in a parallel direction, wherein a distance between the top peg and the pivot rod is separated by a first distance that is less than a second distance between a connection point of the forward and rearward links to the connecting member.

8. The vehicle seat recliner system of claim 7, further comprising:
a motor operably coupled to the forward link and the rearward link and including an actuator.

9. The vehicle seat recliner system of claim 7, further comprising:
a flexible cushion disposed over the seat base.

10. The vehicle seat recliner system of claim 7, further comprising:
a position-securing member including a plurality of securing teeth.

11. The vehicle seat recliner system of claim 10, further comprising:
an engagement member including a plurality of engagement teeth engaged with and complementary to the plurality of securing teeth.

12. The vehicle seat recliner system of claim 7, wherein a bottom portion of the seat back translates down and forward relative to the seat base as the seat back reclines.

13. The vehicle seat recliner system of claim 7, wherein the forward link and the rearward link are pivotally coupled to an upper portion of the seat base.

14. The vehicle seat recliner system of claim 7, wherein the forward link and the rearward link are pivotally coupled to a side support of the seat base.

* * * * *